US012636224B2

(12) United States Patent
Witt

(10) Patent No.: US 12,636,224 B2
(45) Date of Patent: May 26, 2026

(54) STIMULATION DEVICE

(71) Applicant: EIS GmbH, Bielefeld (DE)

(72) Inventor: Florian Witt, Wentorf (DE)

(73) Assignee: EIS GmbH, Bielefeld (DE)

( * ) Notice: Subject to any disclaimer, the term of this patent is extended or adjusted under 35 U.S.C. 154(b) by 1114 days.

(21) Appl. No.: 17/643,257

(22) Filed: Dec. 8, 2021

(65) Prior Publication Data

US 2022/0175612 A1 Jun. 9, 2022

(51) Int. Cl.
*A61H 19/00* (2006.01)
*A61H 9/00* (2006.01)

(52) U.S. Cl.
CPC ........... *A61H 19/34* (2013.01); *A61H 9/0071* (2013.01); *A61H 2201/1669* (2013.01)

(58) Field of Classification Search
CPC ........ A61H 19/00; A61H 19/30; A61H 19/32; A61H 19/34; A61H 9/0071; A61H 2201/1669
See application file for complete search history.

(56) References Cited

U.S. PATENT DOCUMENTS

| | | | | |
|---|---|---|---|---|
| 2,234,102 | A | 3/1941 | Andres | |
| 5,243,968 | A | 9/1993 | Byun | |
| 11,007,110 | B1 * | 5/2021 | Zhou | A61H 23/0263 |
| 11,103,418 | B2 | 8/2021 | Lenke | |
| 2002/0120219 | A1 | 8/2002 | Hovland et al. | |
| 2019/0083354 | A1 * | 3/2019 | Pahl | A61H 9/005 |

(Continued)

FOREIGN PATENT DOCUMENTS

| | | | |
|---|---|---|---|
| CN | 108599516 | A | 9/2018 |
| DE | 102005042092 | A1 | 10/2007 |
| DE | 202013012252 | U1 | 11/2015 |

(Continued)

OTHER PUBLICATIONS

Search Report issued in International Application No. PCT/EP2021/084764, mailed Mar. 31, 2022.

(Continued)

*Primary Examiner* — Samuel G Gilbert
(74) *Attorney, Agent, or Firm* — Bookoff McAndrews, PLLC

(57) ABSTRACT

These objects are solved with a stimulation device for stimulating sensitive body parts such as, in particular, the clitoris, having a pressure field generating device with a hollow body, an application opening formed in the hollow body for application on the sensitive body part, and a movable structure provided at least in or on a section of the hollow body and adapted to cause, by virtue of its mobility, a change in the volume of the hollow body between a minimum value and a maximum value in such a way that a stimulating pressure field is generated in the application opening (8), and a drive device which is designed to apply an alternating reciprocal movement to the movable structure in order to generate the stimulating pressure field in the application opening, wherein the movable structure has a tapered body with a tapered first section which is closed, an open second section into the hollow body, and a peripheral wall which is located between the first section and the second section and, at least in sections, is substantially stair- or step-shaped.

23 Claims, 4 Drawing Sheets

(56) References Cited

U.S. PATENT DOCUMENTS

2022/0015983 A1* 1/2022 Li ...................... A61H 23/0218

FOREIGN PATENT DOCUMENTS

Figure 1:
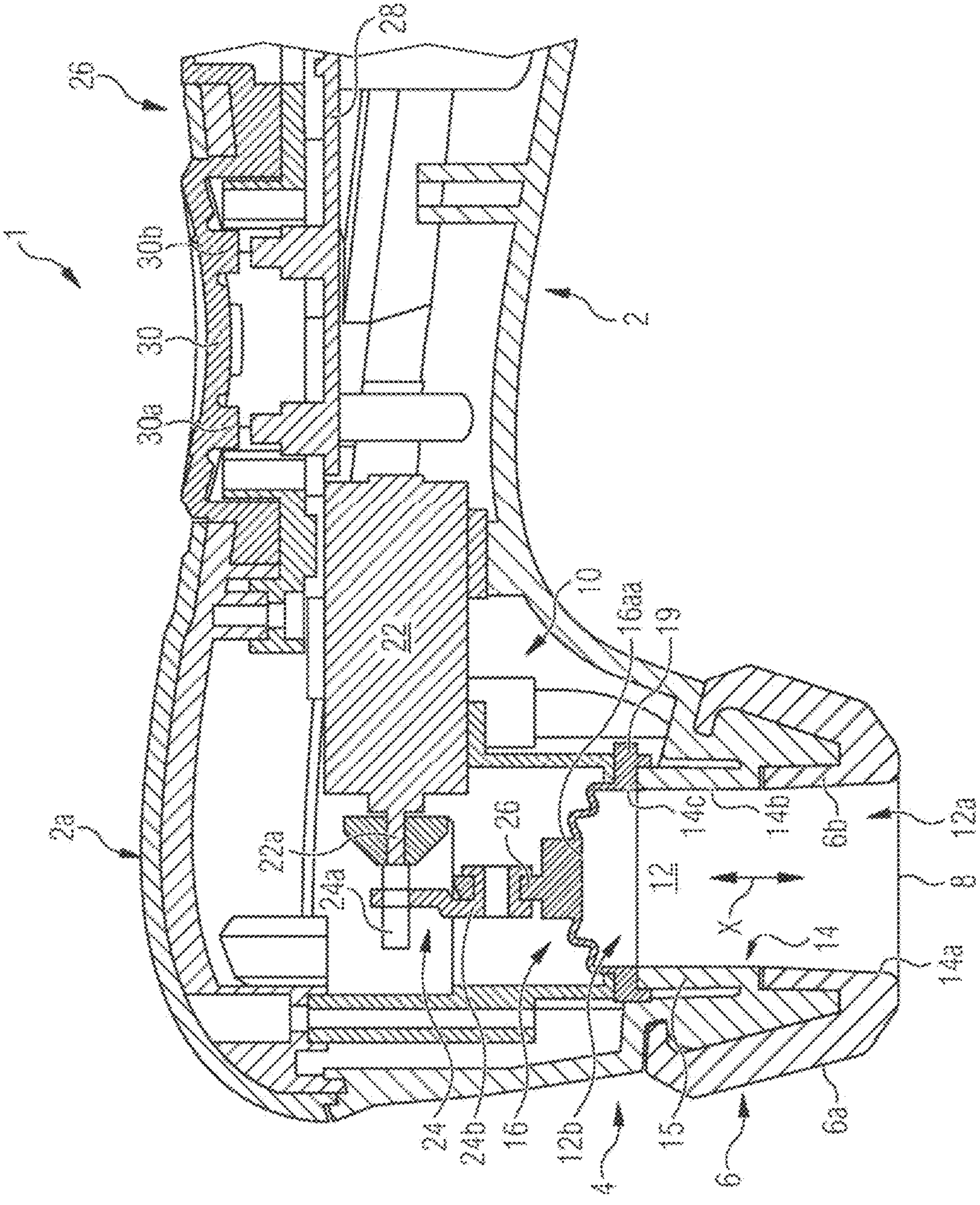

| | | | |
|---|---|---|---|
| DE | 102016105019 | B3 | 7/2017 |
| EP | 3228297 | A1 | 10/2017 |
| EP | 3705106 | A1 | 9/2020 |
| FR | 2746639 | B1 | 10/1997 |
| WO | 2020056206 | A1 | 3/2020 |
| WO | 2021250126 | A2 | 12/2021 |

OTHER PUBLICATIONS

International Preliminary Report on Patentability for International Application No. PCT/EP2021/084764, dated Jun. 13, 2023, pp. 1-8.

* cited by examiner a b c

STIMULATION DEVICE

CROSS REFERENCE TO RELATED APPLICATION(S)

This application claims benefit from German Patent Application DE102020132597.5 filed on Dec. 8, 2020, its content being incorporated herein by reference.

The invention describes a stimulation device for stimulating sensitive body parts such as, in particular, the clitoris, having a pressure field generating device with a hollow body, an application opening formed in the hollow body for application on the sensitive body part, and a movable structure provided at least in or on a section of the hollow body and adapted to cause, by virtue of its mobility, a change in the volume of the hollow body between a minimum value and a maximum value in such a way that a stimulating pressure field is generated in the application opening, and a drive device which is designed to apply an alternating reciprocal movement to the movable structure in order to generate the stimulating pressure field in the application opening.

A device of the type mentioned above is known, for example, from EP 3 228 297 A1. In this known device, the inner end of a cavity formed by a hollow body remote from the application opening is closed by a membrane which is moved by the drive device alternately in the direction towards the application opening formed in the outer end of the cavity remote from the inner end and in the opposite direction thereto. The reciprocal movement of the membrane causes a change in the volume of the antechamber, creating a stimulating pressure field and/or reciprocal air flow in the application opening. For the most efficient operation, the membrane is acted upon by the drive device with a reciprocal movement substantially at right angles to the longitudinal extension of the membrane. During its reciprocal movement, the membrane undergoes deflection or bending alternately in both directions. Even though the use of a membrane has proven itself well in practice so far, the development of some new devices has partly shown that the use of conventional membranes may have limitations with regard to their design and function. For example, conventional membranes cannot be bent to any degree. Rather, due to the design, the degree of deflection or bending is limited, which then also limits the maximum amount of volume change and thus the resulting maximum possible amplitude of the pressure waves of the stimulating pressure field. Furthermore, in some new developments, spatial and/or design constraints present there cause problems in implementing a conventional membrane.

It is a object of the present invention to improve a stimulation device of the type mentioned at the beginning in such a way that there is greater scope for determining the maximum amount of volume change and thus the maximum amplitude of the pressure waves compared with the prior art.

In particular, it is an object of the present invention to propose a stimulation device of the type mentioned at the beginning, with a construction that is alternative to the prior art and at the same time simple and effective, and which is not subject to the constructive and/or functional limitations that are present in the implementation of a conventional membrane.

These objects are solved with a stimulation device for stimulating sensitive body parts such as, in particular, the clitoris, having a pressure field generating device with a hollow body, an application opening formed in the hollow body for application on the sensitive body part, and a movable structure provided at least in or on a section of the hollow body and adapted to cause, by virtue of its mobility, a change in the volume of the hollow body between a minimum value and a maximum value in such a way that a stimulating pressure field is generated in the application opening (8), and a drive device which is designed to apply an alternating reciprocal movement to the movable structure in order to generate the stimulating pressure field in the application opening, wherein the movable structure has a tapered body with a tapered first section which is closed, an open second section into the hollow body, and a peripheral wall which is located between the first section and the second section and, at least in sections, is substantially stair- or step-shaped.

With the aid of the invention, instead of a deflectable or bendable membrane which is substantially flat at rest, a movable structure having a tapered body with a peripheral and, at least in sections, substantially stair- or step-shaped wall is proposed as the design measure responsible for the volume change, wherein the movable structure opens from a tapered, closed first section to a second section communicating with the hollow body and having a width which is wider than that of the first section. The design of the wall as at least in sections substantially stair- or step-shaped in the movable structure according to the invention enables the structure and in particular its first section to be movable relative to its second section. As a result, the movable structure formed according to the invention is in this respect variable in length in its direction of movement and can be compressed and extended in the manner of a bellows or accordion in order to achieve the desired change in volume in the hollow body for generating a stimulating pressure field and/or a reciprocal air flow in the application opening. The movable structure in the sidewall designed according to the invention is not subject to any significant design limitations, so that the desired maximum amount of volume change and thus the resulting desired maximum amplitude of the pressure waves of the stimulating pressure field can be realized without any significant limitations. This is because the more variable the length of the movable structure in its direction of movement, the higher the maximum amount of volume change. Due to the tapered body, the movable structure has the shape of a cap and maintains sufficient stability during its movement so that, in particular, support from the outside is not required.

In this context, it should also be noted that, for the purposes of the present invention, the term “hollow body” can also include an arrangement of several components, provided that a cavity is formed and delimited together with these components, and likewise the term “hollow body” is also to be seen quite generally as a synonym for cavity. Furthermore, it should be noted in this context that, for the purposes of the present invention, the hollow body does not necessarily have to be a structurally separate object, but can also form, with one or more sections or completely, the part of another component or object of the stimulation device.

Even if an air flow is mentioned, it should be noted in this context that in principle any kind of gaseous medium can be used. Alternatively or additively, the medium can also be a liquid medium, in particular water or a commercial lubricant. When a lubricant is used, the lubricant can be introduced into the hollow body, in particular before using the stimulation device. In this way, if necessary, the stimulation of the corresponding skin area can also be carried out with a suitable skin-friendly liquid instead of a gaseous medium. As a further example, the stimulation device according to the invention can also be used under water with water as the liquid medium, for example in a bathtub or swimming pool, for which purpose the stimulation device should then be designed to be waterproof.

The reference pressure is usually the ambient pressure in relation to the hollow body at the start of the application, i.e. before the stimulation device is placed on the skin area to be stimulated, whereby in the case of air the reference pressure is the current air pressure or normal pressure.

Preferred embodiments and developments of the invention are given in the dependent claims.

Preferably, the movable structure is arranged on or in the hollow body in such a way that the direction of movement of the movable structure is oriented parallel to the direction of the stimulating pressure field or the reciprocal air flow in the application opening or coincides with the direction of the stimulating pressure field or the reciprocal air flow in the application opening. In this embodiment, since the movable structure and the application opening are substantially opposite each other, and thereby the pressure waves and/or the air flow travel in the longitudinal direction of the hollow body while being guided by the sidewall of the hollow body, there is substantially direct and unobstructed transmission of the pressure waves and/or the air flow between the movable structure and the application opening.

Alternatively, the movable structure is arranged on or in the hollow body in such a way that the direction of movement of the movable structure is oriented at an angle, in particular substantially transversely, to the direction of the stimulating pressure field or the reciprocal air flow in the application opening. This alternative arrangement is particularly advantageous for difficult space conditions.

Usefully, the first section of the movable structure is arranged at a distance from the second section of the movable structure and/or the hollow body, wherein the distance has a maximum value, when the movable structure is in a moving position in which the volume of the hollow body has substantially the maximum value, and the distance has a minimum value when the movable structure is in a moving position in which the volume of the hollow body has substantially the minimum value. In order to make particular use of the stroke between the minimum value and the maximum value, in a further embodiment of this design the minimum value of the distance is substantially zero.

In a likewise structurally particularly advantageous embodiment, the movable structure forms a one-piece component.

Another preferred embodiment is characterized in that the first section comprises a substantially platelet-shaped element, preferably extending substantially perpendicular to the direction of movement of the movable structure, and preferably formed more rigidly than at least a section of the wall or made of a rigid body. With this design, the reciprocal movement generated by the drive device is transmitted to the moving structure in a particularly simple and at the same time effective manner.

More conveniently, the drive device is configured to apply an alternating reciprocal movement to the first section of the movable structure, preferably wherein the first section of the movable structure includes a coupling element mechanically coupled to the drive device.

For the simplest possible realization of the lifting movement, the wall of the movable structure should preferably be made of flexible material, at least in sections.

A particularly preferred embodiment is characterized in that the peripheral wall of the movable structure has alternating inwardly and outwardly directed peripheral wall portions each connected to the other by a fold line, wherein preferably in addition the peripheral wall portion closest to the first section of the movable structure is bounded by a fold line closest to the first section of the movable structure and/or the peripheral wall portion closest to the second section of the movable structure is bounded by a fold line closest to the second section of the movable structure.

Thus, in this embodiment, the movable structure can be alternately pulled apart and compressed or squeezed between the first section and the second section of the body thereof, like a bellows or an accordion. Accordingly, the desired length and thus the desired length variability are obtained depending on the number and/or dimensioning of the width of the individual wall portions.

In a development of this embodiment, the fold lines each span a plane that preferably extends substantially perpendicular to the direction of movement of the movable structure, whereby a substantially equal pressure pattern and/or air flow can be achieved across the width of the movable structure.

In an additional development of the aforementioned embodiment, the peripheral wall portions have substantially the same width defined transverse to the fold lines, resulting in a substantially simple construction.

An additional development of the aforementioned embodiment is characterized in that the plane spanned by a fold line closest to the first section of the movable structure has a smaller area bounded by said fold line than the plane spanned by a fold line closest to the second section of the movable structure. This development takes into account the circumstance in a constructively particularly simple and at the same time effective manner that the movable structure is to be provided with a tapered shape.

To avoid kinks, which are subject to increased wear due to the risk of breakage, it is advantageous to preferably design the edge regions of the wall portions containing a fold line as curved or rounded substantially in the direction transverse to the fold lines.

Preferably, the hollow body has a first end provided with the application opening and a second end remote from the first end and bounded by a peripheral sidewall interconnecting its both ends. Thus, not only is the hollow body bounded by the sidewall, but the sidewall forms and encloses a cavity.

In a development of the aforementioned embodiment, the sidewall is provided with the movable structure in at least one section, whereby, with the movable structure, the design measure responsible for the volume change is displaced into the peripheral sidewall of the hollow body.

In an alternative development, the second end of the hollow body has the movable structure. In this alternative development, the movable structure is disposed substantially furthest from the application opening, whereby the pressure waves and/or air flow are directed substantially directly and unobstructively between the movable structure and the application opening along the sidewall.

Preferably, the pressure field should consist of a pattern of relative negative and positive pressures modulated onto a reference pressure, preferably the normal pressure. "Normal pressure" is usually understood to mean the ambient air pressure. However, if required, the reference pressure can also deviate significantly from the ambient air pressure.

In a further development of the above-mentioned exemplary embodiment, the amount of the relative positive pressure, in relation to the normal pressure, is smaller than the amount of the relative negative pressure, in relation to the normal pressure, and in particular is not more than 10% of the amount of the relative negative pressure, in relation to the normal pressure. It has been found that under normal conditions of use, when the stimulation device is placed with its application opening on the part of the body to be stimulated and is not subjected to excessively strong contact pressures, any relative positive pressures that may occur can largely escape due to the compliance of the part of the body to be stimulated, which is caused by soft tissue, so that even for these rather factual considerations the focus should be on a pressure field to be modulated predominantly in the negative pressure range. For this reason, it is also conceivable alternatively that a pressure field is created from a pattern substantially only of relative negative pressures, which are then modulated onto the reference pressure.

Preferably, the pressure field has a substantially sinusoidal-periodic pressure curve, for which the drive device must cause a regular change in the volume of the cavity, for example with the aid of an arrangement consisting of a rotary motor and an eccentric mechanism.

Preferably, the stimulation device can have no valves, which could otherwise cause unwanted contamination.

Another preferred exemplary embodiment is characterized in that the hollow body is formed by a single continuous chamber. A single-chamber arrangement realized with this exemplary embodiment is characterized by a particularly simple and fluidically effective design. From a fluidic point of view, a single-chamber arrangement is therefore particularly interesting, since throttling effects, which occur in particular due to bottlenecks, are avoided. The single-chamber arrangement also has clear advantages in terms of hygiene requirements, since no dirt particles can settle in the absence of constrictions that would otherwise divide the hollow body into two or more chambers. For the same reason, the single-chamber arrangement is also much easier to clean.

To achieve a substantially uniform, unobstructed and thus effective air flow, it is advantageous if preferably the peripheral sidewall bounding the hollow body and connecting its both ends is free of discontinuities.

Preferably, in order for the air flow velocity to be substantially unchanged or at least nearly constant along the entire length of the hollow body, the cross-section of the hollow body defined transverse to its length between its two ends should be substantially unchanged or at least nearly constant at least outside the peripheral variable length structure. By cross-section is preferably meant the cross-sectional shape and/or the cross-sectional area.

Further, preferably, the hollow body may be substantially in the form of a body of revolution having a circular or elliptical cross-section and/or in the form of a continuous tube.

In order to utilize the effect of the air flow or pressure waves at the application opening as fully as possible, the opening cross-section of the application opening should preferably correspond substantially to the cross-section of the section of the hollow body adjacent to the application opening.

Preferably, a control device can be provided which controls the drive device and has at least one operating means by which the respective modulation of the pressure field can be changed.

It is advisable that the stimulation device should be designed as a hand-held device, preferably powered by a battery.

Figure 2:
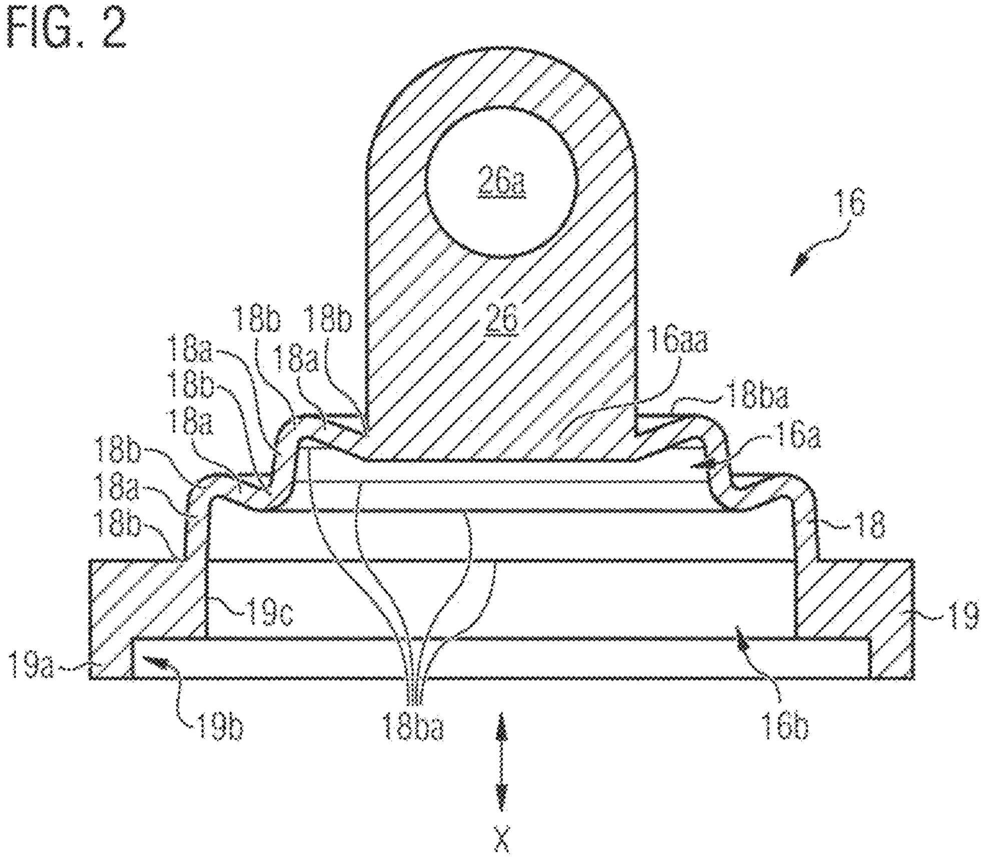
Figure 3:
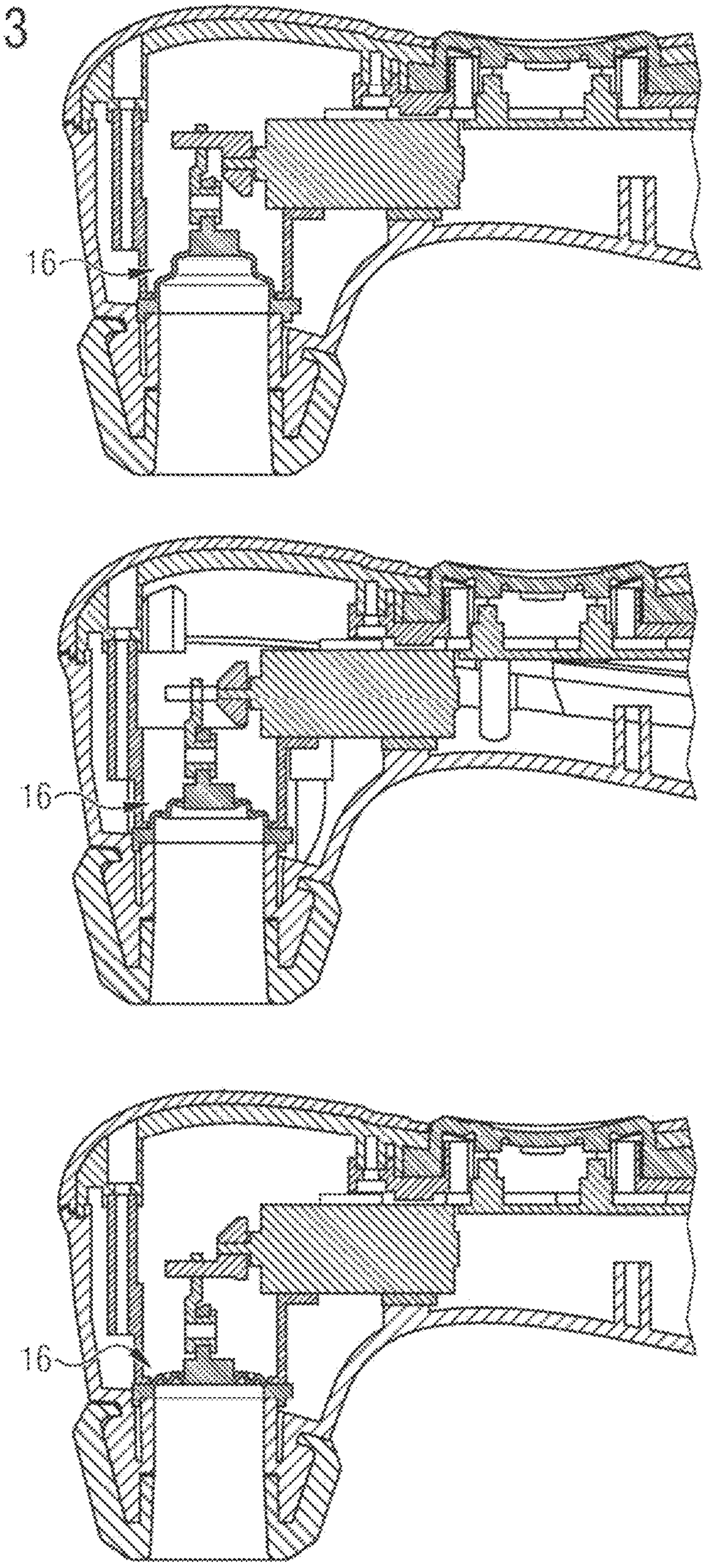
Figure 4:
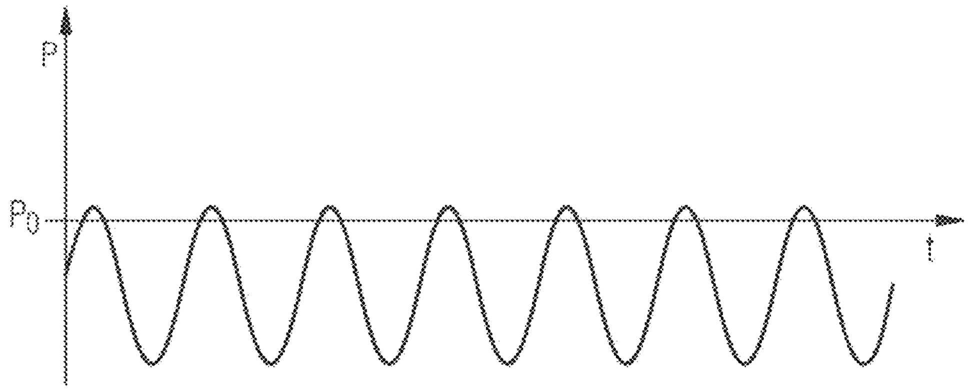

In the following, preferred exemplary embodiments of the invention are explained in more detail with reference to the accompanying drawings. Showing:

FIG. 1 in longitudinal section a section of the pressure wave massage device in the region of its head according to a preferred embodiment;

FIG. 2 in longitudinal section an enlarged individual view of an assembly provided in the pressure wave massage device of FIG. 1, including a connecting element, movable structure, and coupling element;

FIG. 3*a* to *c* the same view as FIG. 1 with different states of motion of the variable length structure; and FIG. 4 a preferred pressure waveform generated with the pressure wave massage device according to the preceding figures.

In FIG. 1, a longitudinal sectional view of a pressure wave massage device 1 according to a preferred embodiment is shown in the region of its head. The pressure wave massage device 1 has a housing 2 which, in the exemplary embodiment described herein, is divided into three housing sections, namely a first end section, a second end section remote from the first end section, and an intermediate section therebetween. In FIG. 1, only the first end section 2*a* and partially the middle section 2*b* of the housing 2 are shown. As FIG. 1 further indicates, in the illustrated embodiment, the first end section 2*a* tapers slightly toward the middle section 2*b* of the housing 2 and the middle section 2*b* has an elongated shape. The second end section of the housing 2, which is not shown in FIG. 1, forms a kind of extension of the middle section 2*b* and substantially continues the elongated shape of the middle section 2*b* of the housing 2, although the width of the second end section increases slightly compared to the middle section 2*b* of the housing 2. Thus, in the illustrated embodiment, the housing 2 has an elongated shape. As FIG. 1 further indicates, the first end section 2*a* of the housing 2 is rounded, with the second end section of the housing 2, which is not shown, also being rounded.

An extension 4 projecting transversely to the longitudinal extension of the housing 2 is formed on the first end section 2*a* of the housing 2 and, together with the first end section 2*a* of the housing 2 forms a head of the pressure wave massage device 1, while the second end section of the housing 2, which is not shown, preferably serves as a handle for holding the pressure wave massage device 1 during the application to be described in more detail below.

Preferably, the housing 2 is made of plastic and is composed of two half-shells in the direction of its longitudinal extension, one of which is provided with the aforementioned extension 4. The two half-shells of the housing 2, which are not marked in more detail in FIG. 1, are preferably glued together; alternatively, however, it is also conceivable, for example, to connect the two half-shells of the housing 2 together in another way, for example with the aid of screws or locking means attached to their inner sides.

As FIG. 1 further shows, a grommet 6 sits on top of the extension 4 and contains an application opening 8. Preferably, the grommet 6 is made of a flexible plastic material such as, in particular, a silicone material. The head of the pressure wave massage device 1 formed by the first end section 2*a* of the housing 2 and the extension 4 houses a pressure wave generating device 10, by means of which a stimulating pressure field and/or a reciprocal air flow is generated in the opening 8, as will be explained in more detail below. As shown in detail in FIG. 1, the pressure field generating device 10 includes a hollow body 12 having an outer first end 12*a* and an inner second end 12*b* opposite and remote from the first end 12*a*, wherein the first end 12*a* of the hollow body 12 opens into the application opening 8 in the grommet 6. In the illustrated exemplary embodiment, the hollow body 12 forms a single continuous chamber and is bounded by an inner or sidewall 14 connecting its both ends 12*a*, 12*b*.

As FIG. 1 further indicates, the grommet 6 has an outer section 6*a*, by which it is removably attached to the extension 4, and an inner section 6*b*, wherein the outer section 6*a* and the inner section 6*b* of the grommet 6 are connected to each other in the region of the application opening 8. The inner section 6*b* of the grommet 6 is shaped in the manner of a sleeve and forms an outer section of the hollow body 12 leading to its outer first end 12*a*. Thus, the inner wall of the sleeve-shaped inner section 6*b* of the grommet 6 simultaneously forms a first section 14*a* of the inner or sidewall 14 of the hollow body 12 leading to the application opening 8. Furthermore, in the illustrated exemplary embodiment, the chamber formed by the hollow body 12 is delimited by an internal annular element 15, whose inner wall simultaneously forms a middle second section 14*b* of the sidewall 14 of the hollow body 12. The inner annular element 15 is preferably made of substantially inflexible or rigid material.

At the end of the annular element 15 adjacent to the second end 12*b* of the hollow body 12, in the illustrated embodiment example, a peripheral movable structure 16 is connected, which is designed to be movable in the direction of the longitudinal extension of the hollow body 12 according to double arrow X, is arranged at or in the second end 12*b* of the hollow body 12 or forms the second end 12*b* of the hollow body 12, wherein its inner wall of the section of the movable structure 16 adjacent to the annular element 15 simultaneously forms an inner third section 14*c* of the sidewall 14. In the illustrated exemplary embodiment, the movable structure 16 is designed in the manner of a cap. Accordingly, in the illustrated exemplary embodiment, the hollow body 12 is composed of the sleeve-shaped inner section 6*b* of the grommet 6, the annular element 15 and the structure 16. The arrangement of grommet 6, annular element 15 and structure 16 in the illustrated exemplary embodiment is such that the three sections 14*a*, 14*b* and 14*c* of the sidewall 14 are aligned with one another, so that the sidewall 14 of the hollow body 12 is free of discontinuities, any inaccuracies in the drawings in this context being irrelevant.

In the illustrated embodiment example, the hollow body 12 preferably has substantially the shape of a body of revolution with a circular or elliptical cross-section, wherein the cross-section defined transversely to its length between its both ends 12*a*, 12*b* of the hollow body 12 is substantially constant at least along the second section 14*b* of its sidewall 14 and widens only slightly along the first section 14*a* of its sidewall 14 towards the application opening 8, wherein the opening cross-section of the application opening 8 corresponds to the cross-section of the hollow body 12 at least at its first end 12*a*. Alternatively, however, it is also conceivable to design the first section 14*a* of the sidewall 14 formed by the sleeve-shaped inner section 6*b* of the grommet 6 in exact alignment with the middle second section 14*b* of the sidewall 14 formed by the inner wall of the annular element 15, so that the cross-section of the hollow body 12 in the region of the first section 14*a* of the sidewall 14 is equal to the cross-section in the region of the middle second section 14*b* of the sidewall 14. Furthermore, it is also alternatively conceivable to provide the hollow body 12 with an angular, for example square, cross-section instead of a round cross-section. Thus, in the illustrated embodiment example, the hollow body 12 has the shape of a continuous tube oriented in the direction of its length approximately transverse to the longitudinal extension of the housing 2.

However, it is in principle conceivable to provide the hollow body 12 with various alternative embodiments, provided that the transmission of a pressure field and/or an air flow between the movable structure 16 and the application opening 8 remains guaranteed. For example, it is conceivable to provide the sidewall of the hollow body with constrictions or discontinuities. In particular, it is alternatively conceivable to divide the hollow body 12 into an internal first chamber delimited by the movable structure 16 and a second chamber opening into the application opening 8, wherein the two chambers are connected to each other by a connecting element.

The structure 16 is designed to be reciprocally movable in the direction of the double arrow X shown in FIG. 1. For this purpose, the movable structure 16 is driven accordingly by a drive device 20 comprising a drive motor 22 and designed to convert the rotary movement of the output shaft 22*a* of the drive motor 22 into a reciprocal longitudinal movement. For this purpose, the drive device 20 in the illustrated exemplary embodiment includes an eccentric arrangement 24 which has an eccentric pin 24*a* arranged on the output shaft 22*a* of the drive motor 22, but at a radial distance from the axis of rotation of the output shaft 22*a*, and a connecting rod 24*b* on which the eccentric pin 24*a* is movably mounted. The connecting rod 24*b* is provided at its end adjacent to the eccentric pin 24*a* with a bore, not further indicated in FIG. 1, through which the eccentric pin 24*a* is loosely inserted. At the opposite end, the connecting rod 24*b* is coupled to a coupling element 26 disposed on the movable structure 16. Thus, the rotation of the output shaft 22*a* of the drive motor 22 is converted into reciprocal longitudinal movement of the connecting rod 24*b*, whereby the structure 16 is substantially set in motion alternately in the direction toward the application opening 8 and in the opposite direction thereto.

In this way, the movable structure 16 is alternately pulled apart and compressed or squeezed. This causes the volume of the chamber formed by the hollow body 12 and bounded by the movable structure 16 to change between a minimum volume and a maximum volume, so that alternating negative and positive pressures are generated in the hollow body 12 and thus a corresponding stimulating pressure field in the application opening 8 and/or a reciprocal air flow in the application opening 8. In this context, it should also be noted that instead of using a rotary motor and an eccentric arrangement, other types of drive are also conceivable in principle in order to apply a reciprocal movement to the structure 16, which can also be done, for example, electromagnetically, piezoelectrically, pneumatically or hydraulically.

In the illustrated exemplary embodiment, the drive motor 22 is an electric motor connected to an electronic control circuit board 28 that controls the drive motor 22. A battery, not shown in FIG. 1, is connected to the control circuit board 28 to provide the necessary electrical power to the drive motor 22 and the control circuit board 28. This battery can be either a non-rechargeable battery or a rechargeable battery. While in the illustrated exemplary embodiment the drive motor 22 is located in the first end section 2*a* of the housing 2, the battery not shown in FIG. 1 is located in the second end section of the housing 2 also not shown in FIG. 1, whereby the housing 2 is well balanced when the pressure wave massage device 1 is held in the hand by the user.

As FIG. 1 further shows schematically, in the illustrated embodiment example, a rocker switch 30 accessible from the outside is arranged in the connection area between the first end section 2*a* and the middle section 2*b* of the housing 2, with the two end sections 30*a*, 30*b* of which certain switching operations can be carried out. For example, one end section 30*a* of the rocker switch 30 may be provided for turning the pressure wave massage device 1 on and off, and the other end section 30*b* may be provided for setting various operating states.

In addition to controlling the drive motor 22, the electronic control circuit board 28 in the illustrated exemplary embodiment also manages the charge of the battery not shown in FIG. 1. For this purpose, the control circuit board 28 is connected to charging contacts, also not shown in FIG. 1, which are accessible from the outside and are preferably arranged on the front side of the second end section of the housing 2, also not shown in FIG. 1. An external charger, also not shown in FIG. 1, can be connected to these connection contacts via a plug with magnetic plug contacts, which can be brought into contact with the connection contacts due to magnetic forces in order to establish an electrical connection.

FIG. 2 shows in longitudinal section an enlarged individual view of an assembly containing the movable structure 16 from the pressure wave massage device 1 shown in FIG. 1. As FIG. 2 indicates, the structure 16 has a tapered body with a tapered first section 16*a* that is closed, an open second section 16*b* into the hollow body 12, and a peripheral wall 18 which is located between the first section 16*a* and the second section 16*b* that is substantially stair- or step-shaped. In the embodiment of FIG. 2, the movable structure 16 assumes a state in which the first section 16*a* is at an intermediate distance from the second section 16*b*. This distance assumes a maximum value when the movable structure 16 is in a position of movement in which it is maximally extended and, as a result, the volume of the chamber formed by the hollow body 12 and delimited by the movable structure 16 has a maximum value, and a minimum value when the movable structure is in a position of movement in which said volume has substantially the minimum value. Preferably, the minimum value of said distance is substantially zero.

As can be further seen in particular in FIG. 2, the first section 16*a* of the movable structure 16 comprises a substantially platelet-shaped element 16*aa*, whereby the movable structure 16 is closed in the region of its first section 16*a*. In the illustrated embodiment, the platelet-shaped element 16*aa* extends substantially perpendicular to the direction of movement of the movable structure 16 indicated by the double arrow X in FIG. 2. While the peripheral wall 18 of the movable structure 16 has flexibility to allow the first section 16*a* to have said reciprocal mobility with respect to the second section 16*b* of the movable structure 16, the platelet-shaped element 16*aa* should be substantially rigid or at least more rigid than the peripheral wall 16. As can be seen from the FIGS. 1 and 2, the coupling element 26 is arranged on the outer side (corresponding to the upper side in the perspective of FIG. 2) of the first section 16*a* of the movable structure 16. As mentioned above, the coupling element 26 is mechanically coupled to the drive device 20 to impart alternating reciprocal movement to the first section 16*a* of the movable structure 16. In the illustrated exemplary embodiment according to FIG. 2, the coupling element 26 extends in the direction of its width substantially over the entire platelet-shaped element 16*aa*, which helps to achieve the desired stiffness of the platelet-shaped element 16*aa*.

The peripheral wall 18 of the movable structure 16 has alternating inwardly and outwardly directed peripheral wall portions 18*a*. In this case, the outwardly directed wall portions 18*a* extend approximately in the direction of movement of the structure 16 according to double arrow X, and in each case two adjacent wall portions 18*a* are oriented at an angle to each other to realize the desired stair- or step-shaped design of the wall 18. This angle increases when the movable structure 16 is pulled apart and decreases when the movable structure 16 is compressed.

As FIG. 2 further indicates, the second section 16*b*, at which the movable structure opens into the hollow body 12, has a preferably annular, peripheral connecting element 19, at which the stair- or step-shaped wall 18 ends and is fixed there. This connecting element 19, in turn, serves in the illustrated embodiment example according to FIG. 1 for the, in particular fixed, arrangement of the movable structure 16 on the annular element 15. For this purpose, in the illustrated embodiment example, the connecting element 19 is provided with a projection 19*a* on its side facing the annular element 15 (corresponding to the underside in the perspective of FIGS. 1 and 2) which forms an undercut or shoulder 19*b* with respect to the peripheral wall 19*c* of the connecting element 19. To arrange the movable structure 16 on the annular element 15, according to the drawing of FIG. 1, the projection 19*a* of the annular connecting element 19 overlaps the adjacent edge section of the annular element 15, whereby the movable structure 16 is locked with the annular connecting element 19 with respect to the annular element 15. As FIG. 2 in conjunction with FIG. 1 further indicates, the annular connecting element 19 is further configured such that its inner wall 19*c* is aligned with the middle second section 14*b* of the sidewall 14 of the hollow body 12. Thus, the inner wall 19*c* of the annular connecting element 19 of the movable structure 16 forms the third section 14*c* of the sidewall 14 of the hollow body 12 mentioned above.

As it can further be seen from FIG. 2, in the illustrated exemplary embodiment, the wall 18 of the movable structure 16 has four wall portions 18*a*. In this regard, in the illustrated exemplary embodiment, the first wall portion 18*a* adjacent to the platelet-shaped body 16*aa* at the first section 16*a* and thus closest thereto is bounded by a fold line 18*b* provided between this wall portion 18*a* and the platelet-shaped body 16*aa*, and the fourth wall portion 14*a* adjacent to the annular connecting element 19 is bounded by a fold line 18*b* provided between this wall portion 14*a* and the annular connecting element 19. Of the intervening wall portions 18*a*, the second wall portion 18*a* is bounded by two fold lines 18*b*, of which one fold line 18*b* connects to the first wall portion 18*a* adjacent to the platelet-shaped body 16*aa* of the first section 16*a* and the other fold line 18*b* connecting to the adjacent third wall portion 18*a*. In the same way, the third wall portion 18*a* is also delimited by two fold lines 18*b*, one of which forms the connection with the adjacent second wall portion 18*a* and the other fold line 18*b* forms a connection with the fourth wall portion 18*a* adjacent to the annular connecting element 19.

As FIG. 2 further indicates, in the illustrated exemplary embodiment, the peripheral wall portions 18*a* between the two fold lines 18*b* defining them have substantially the same width defined transversely to the fold lines 18*b*.

Furthermore, in the illustrated exemplary embodiment, the fold lines 18*b* each span a virtual plane 18*ba* extending substantially perpendicular to the direction of reciprocal movement of the first section 16*a* of the movable structure 16 according to double arrow X. Accordingly, in the embodiment example shown, the planes mentioned run substantially parallel to each other. As FIG. 2 also indicates, in the illustrated exemplary embodiment the platelet-shaped body 16*aa* provided at the first section 16*a* also extends substantially parallel to the planes 18*ba* and thus also defines a corresponding virtual plane. Likewise, a virtual plane can be defined in a corresponding manner for the annular connecting element 19 from its cross-sectional and/or opening plane, which is oriented substantially parallel to the aforementioned planes 18*ba*. During the movement of the movable structure 16, the distances between the individual virtual planes change. When the movable structure 16 is expanded, the distance between each virtual plane increases; and conversely, when the movable structure 16 is compressed, the distance between each virtual plane decreases. Due to the tapered configuration of the movable structure 16, the virtual plane 18*ba* spanned by the fold line 18*b* between the platelet-shaped body 16*aa* and the first wall portion 18*a* in the region of the first section 16*a* of the movable structure 16 has a smaller area bounded by said fold line 18*b* than the fold line 18*b* between the annular connecting element 19 and the fourth wall portion 18*a* in the region of the second section 16*b* of the movable structure 16, while the areas bounded by the intermediate fold lines 18*b* increase from virtual plane to virtual plane from the first section 16*a* toward the second section 16*b* of the movable structure 16.

Furthermore, it should be noted at this point that the edge regions of the wall portions 18*a* each containing a fold line 18*b* are curved or rounded substantially in the direction transverse to the fold lines 18*b*, as can also be seen in FIG. 2.

As FIG. 2 further indicates, the arranged coupling element 26 is provided with a bore 26*a* through which a pin, not shown in the figures, is inserted which extends through a complementary bore, also not further indicated in the figures, in the connecting rod 24*b* shown in FIG. 1, whereby the connecting rod 24*b* is coupled to the coupling element 26.

For achieving the desired mobility of the structure 16, the wall 40 is provided with flexible or elastic material at least in the area of the fold line 40*b*. Preferably, for ease of design, the entire wall 18 may also be made of flexible or resilient material. Silicone is the preferred material for this purpose. In contrast, both the platelet-shaped body 16*aa* in the first section 16*a* of the movable structure 16 and the connecting element 19 are made of a less flexible or less yielding, preferably substantially rigid material, which is in particular a suitable plastic. In the embodiment example shown in FIG. 2, the coupling element 26, the platelet-shaped body 16*aa* in the first section 16*a* of the movable structure 16, the wall 18 and the connecting element 19 together form a one-piece component which, for the sake of simplicity, should be made of the same material; in this case, the flexibility desired for the wall 18, at least in sections, is achieved by the wall thickness being significantly less than that of the platelet-shaped body 16*aa* and the annular connecting element 19, as FIG. 2 indicates. In view of the different properties mentioned above, however, it is alternatively conceivable to provide the platelet-shaped body 16*aa* with the coupling element 26, the wall 18 and the annular connecting element 19 as separate components respectively, which are then to be fastened to one another accordingly.

FIGS. 3*a* to *c* show the movable structure 16 in three different operating states. FIGS. 3*a* to *c* are basically the same longitudinal sectional view as FIG. 1, wherein although for reasons of clarity only the movable structure is marked with the reference number, but in contrast to FIG. 1 no other reference numbers are given. FIG. 3*b* shows the movable structure 16 in a middle position similar to FIGS. 1 and 2. FIG. 3*a* shows the movable structure 16 in a fully extended position, in which the first section 16*a* of the movable structure 16 is at a maximum distance from the application opening 8. In contrast, FIG. 3*c* shows the movable structure 16 in a fully compressed or upset position in which the first section 16*a* of the movable structure 16 is at a minimum distance from the application opening 8. In accordance with the reciprocal movement generated by the drive device 20, the movable structure 16 is alternately pulled apart or lengthened in the manner of an accordion or bellows and thus brought into the state shown in FIG. 3*a* and compressed or shortened again and brought into the state shown in FIG. 3*c*.

In the illustrated exemplary embodiment, in the first section 16*aa* of the movable structure 16, the platelet-shaped body 16*aa* extends substantially parallel to the plane spanned by the application opening 8 and is subjected to a reciprocal movement substantially perpendicular thereto, oriented substantially in the longitudinal direction of the hollow body 12 according to the double arrow X shown in FIG. 1. Thus, the reciprocal movement of the movable structure 16 changes the distance of the first section 16*a* thereof from the application opening 8 and thus from the first end 12*a* of the hollow body 12 by substantially the same amount at each location. Alternatively, however, it is also conceivable to design and/or orient the structure 16 such that, during its reciprocal movement, the distance at different locations of the first section 16*a* of the movable structure 16 from the application opening 8 and thus the first end 12*a* of the cavity 12 changes by a different amount.

In the embodiment example shown in FIG. 1, the movable structure 16 is arranged at the inner second end 12*b* of the hollow body 12 and thus at the location remote from the first end 12*a* of the hollow body 12 with the application opening. Thus, in this embodiment example, since the hollow body 12 forms a single continuous chamber having a substantially straight tubular shape, the movable structure 16 faces the application opening 8. As a result, the pressure waves generated by the reciprocal movement of the structure 16 and/or correspondingly generated air flows travel in the longitudinal direction of the hollow body 12 and are guided by the sidewall 14 of the hollow body 12. Alternatively, however, it is also conceivable to arrange the movable structure 16 on or in the hollow body 12 in such a way that the direction of movement of the movable structure 16 is oriented at an angle, in particular substantially transversely, to the direction of the pressure field or the reciprocal air flow in the application opening 8. In particular, in this alternative arrangement, the movable structure 16 may be integrated into a section of the sidewall 14 of the hollow body 12.

The described pressure wave massage device 1 according to the embodiment shown in FIG. 1 is designed as a hand-held device and is placed for application with the grommet 6 on the body part to be stimulated, which is not shown in the figures, in such a way that it is substantially enclosed by the grommet 6 in the area of the application opening 8. During operation, the body part to be stimulated is then alternately subjected to different air pressures and/or air flows due to the reciprocal movement of the movable structure 16. If no excessively strong contact pressures are applied after the grommet 6 has been placed on the body part to be stimulated, any relative positive pressure that may arise during the respective movement in the direction of the application opening 8 and the resulting shortening of the movable structure 16 due to compression or squeezing can largely escape, so that therefore substantially the pattern shown in FIG. 4 of a modulated relative negative pressure compared to the normal one reference pressure $P_0$ results. Nevertheless, as can be seen from the pressure curve in FIG. 4, relative positive pressures can occur at the maximum compared to the reference pressure $P_0$, but these can be considerably lower than the minima of the relative negative pressure. The amount of relative positive pressure, relative to the reference pressure $P_0$, especially if the reference pressure is the normal air pressure or ambient air pressure, is usually no more than 10% of the amount of the relative negative pressure, but may be higher depending on the operating condition and application. Alternatively, however, it is also quite conceivable that the pressure field consists only of a pattern of relative negative pressures or relative positive pressures modulated onto the reference pressure $P_0$. In particular, the use of a rotary motor with eccentric arrangement results in the sinusoidal-periodic pressure curve shown in FIG. 4.

In the application, a distinction is made between a sealing operation, an open operation and a so-called semi-open operation.

In the sealing operation, the grommet 6 is placed on the body part to be stimulated in such a way that there is no exchange of air with the environment. In this operating condition, the movement of the movable structure 16 generates pressure waves that change over time, preferably periodically, and act throughout the hollow body 12. The pressure waves are substantially isotropic and thus also affect the body part to be stimulated. An air flow, on the other hand, substantially does not occur.

The open operation is characterized by an exchange of air between the hollow body 12 and the environment. In this operating condition, the grommet 6 is placed on the body part to be stimulated such that the application opening 8 only partially surrounds the body part to be stimulated, leaving at least one gap-shaped space between at least a section of the application opening 8 and at least a section of the body part to be stimulated, whereby air is allowed to escape from the hollow body 12 into the environment. Likewise, in this operating condition, air from the environment can be drawn into the hollow body 12, so that in this case a regular exchange of air takes place and within the hollow body 12 the air is reciprocally moved in the direction of the longitudinal extension of the hollow body 12, as indicated by the double arrow X in FIG. 1. In the open operation, the positive pressures and negative pressures are significantly lower than in the sealing operation.

Finally, a so-called half-open operation is also conceivable, in which, after the grommet 6 has initially been placed completely on the body part to be stimulated, no excessively strong contact pressures are exerted, so that, due to a compliance of the body part to be stimulated, any relative negative pressures can escape, as already mentioned above, while, after a negative pressure has arisen in the hollow body 12, upon movement of the movable structure 16 in the direction away from the application opening 8, the sections of the body part to be stimulated which have been opened by the excess pressures are drawn back to the application opening 8 due to the suction effect formed thereby, and thus the body part to be stimulated completely closes the application opening 8 again. In this case, the body part to be stimulated therefore acts in the manner of a check valve. In the semi-open operation, the positive pressures are considerably lower than in the sealing operation, while the negative pressures may be of a magnitude more similar to that of the sealing operation. Experience shows that semi-open operation is the most common application.

Since, as described further above, the cross-section of the cavity 12 is substantially nearly constant at least in the region of the first section 14*a* and the middle second section 14*b* of the sidewall 14, this results in the air flow velocity in both directions being substantially constant at least in the open operation, and in the air flow velocity in the direction towards the application opening 8 also being substantially constant at least in the semi-open operation. In this way, a particularly effective air flow can be generated in these operating states for effective stimulation of the body part to be stimulated with relatively low energy consumption of the drive motor 22.

The aforementioned control circuit board 28 preferably includes a memory, also not shown in the figures, in which various modulation patterns for pressure wave generation and vibration are stored. A desired modulation pattern can then be selected for operation by appropriate operation of the rocker switch 30.

Finally, it should be noted that the stimulation device 1 preferably has no valves.

The invention claimed is:

1. A stimulation device for stimulating sensitive parts of a body selected from one or more of a clitoris or other body part, the stimulation device comprising:

a pressure field generating device comprising a hollow body, an application opening formed in the hollow body for application on the sensitive body part, and a movable structure provided at least in or on a section of the hollow body and adapted to cause, by virtue of its mobility, a change in a volume of the hollow body between a minimum value and a maximum value such that a stimulating pressure field is generated in the application opening, and a drive device which is designed to apply an alternating reciprocal movement to the movable structure in order to generate the stimulating pressure field in the application opening, wherein the movable structure comprises a tapered body having a tapered first section which is closed, an open second section into the hollow body, and a peripheral wall which is located between the first section and the second section and, at least in sections, is substantially stair- or step-shaped and comprises peripheral wall portions alternatively directed inwardly and outwardly and respectively interconnected by a plurality of fold lines, and wherein a virtual plane spanned by a first fold line closest to the first section of the movable structure has a smaller area bounded by said first fold line than the virtual plane spanned by a second fold line closest to the second section of the movable structure, while the areas bounded by intermediate fold lines increase from virtual plane to virtual plane from the first section toward the second section of the movable structure.

2. A device according to claim 1, wherein the movable structure is arranged on or in the hollow body in such a way that a direction of movement of the movable structure is oriented at an angle, in particular transversely, to the direction of the stimulating pressure field in the application opening.

3. A device according to claim 1, wherein the movable structure is arranged on or in the hollow body in such a way that a direction of the movement of the movable structure is oriented parallel to the direction of the stimulating pressure field in the application opening or coincides with the direction of the stimulating pressure field in the application opening.

4. A device according to claim 1, wherein the first section of the movable structure is arranged at a distance from the second section of the movable structure and/or the hollow body, wherein the distance has a maximum value, when the movable structure is in a moving position in which the volume of the hollow body has substantially the maximum value, and the distance has a minimum value when the movable structure is in a moving position in which the volume of the hollow body has substantially the minimum value.

5. A device according to claim 4, wherein the minimum value of the distance is substantially zero.

6. A device according to claim 1, wherein the movable structure forms a one-piece component.

7. A device according to claim 1, wherein said first section comprises a substantially platelet-shaped element extending preferably substantially perpendicularly to a direction of movement of said movable structure.

8. A device according to claim 7, wherein the platelet-shaped element comprises a material that is more rigid than at least a section of the wall or is made of a rigid body.

9. A device according to claim 1, wherein the drive device is adapted to apply an alternating reciprocal movement to the first section of the movable structure.

10. A device according to claim 9, wherein the first section of the movable structure comprises a coupling element mechanically coupled to the drive device.

11. A device according to claim 1, wherein the wall of the movable structure consists at least in sections of flexible material.

12. A device according to claim 1, wherein a peripheral wall portion closest to the first section of the movable structure is bounded by the first fold line closest to the first section of the movable structure and/or the peripheral wall portion closest to the second section of the movable structure is bounded by the second fold line closest to the second section of the movable structure.

13. A device according to claim 12, wherein the fold lines each span a plane that preferably extends substantially perpendicular to the direction of the movement of the movable structure.

14. A device according to claim 12, wherein the peripheral wall portions have substantially a same width defined transversely to the fold lines.

15. A device according to claim 1, wherein an opening cross-section of the application opening substantially corresponds to the cross-section of the section of the hollow body adjacent to the application opening.

16. A device according to claim 1, wherein edge regions of the wall portions including the fold line are curved or rounded substantially in a direction transverse to the fold lines.

17. A device according to claim 1, wherein the hollow body has a first end which is provided with the application opening and a second end remote from the first end and is bounded by a peripheral sidewall interconnecting both its ends.

18. A device according to claim 17, wherein the sidewall is provided in at least one section with the movable structure.

19. A device according to claim 17, wherein the second end of the hollow body comprises the movable structure.

20. A device according to claim 1, wherein an interior of the hollow body is free of discontinuities at least outside the movable structure for achieving a substantially uniform, unobstructed air flow.

21. A device according to claim 1, wherein the hollow body is formed by a single continuous chamber.

22. A device according to claim 21, wherein the hollow body is substantially in the form of a body of revolution having a circular or elliptical cross-section.

23. A device according to claim 21, wherein the hollow body is in the form of a continuous tube.

* * * * *